(12) United States Patent
Liu

(10) Patent No.: US 12,190,882 B2
(45) Date of Patent: Jan. 7, 2025

(54) METHOD AND APPARATUS FOR GENERATING GENERAL VOICE COMMANDS AND AUGMENTED REALITY DISPLAY

(71) Applicant: HANGZHOU LINGBAN TECHNOLOGY CO. LTD., Hangzhou (CN)

(72) Inventor: Weiming Liu, Hangzhou (CN)

(73) Assignee: HANGZHOU LINGBAN TECHNOLOGY CO. LTD., Hangzhou (CN)

( * ) Notice: Subject to any disclaimer, the term of this patent is extended or adjusted under 35 U.S.C. 154(b) by 0 days.

(21) Appl. No.: 18/254,258

(22) PCT Filed: Nov. 30, 2021

(86) PCT No.: PCT/CN2021/134460
§ 371 (c)(1),
(2) Date: May 24, 2023

(87) PCT Pub. No.: WO2022/116969
PCT Pub. Date: Jun. 9, 2022

(65) Prior Publication Data
US 2024/0021197 A1    Jan. 18, 2024

(30) Foreign Application Priority Data
Dec. 1, 2020   (CN) .......................... 202011399164.8

(51) Int. Cl.
G10L 15/00    (2013.01)
G10L 15/22    (2006.01)
G10L 15/08    (2006.01)

(52) U.S. Cl.
CPC .............. *G10L 15/22* (2013.01); *G10L 15/08* (2013.01); *G10L 2015/223* (2013.01)

(58) Field of Classification Search
CPC ......... G10L 15/07; G10L 15/20; G10L 15/22; G10L 15/26; G10L 15/30; G10L 15/096;
(Continued)

(56) References Cited

U.S. PATENT DOCUMENTS

| 9,081,550 B2 * | 7/2015 | Oz ........................... G06F 3/167 |
| 2015/0170652 A1 * | 6/2015 | Kaplan ................... G10L 15/22 |
| | | 704/246 |

(Continued)

FOREIGN PATENT DOCUMENTS

| CN | 107678744 A | 2/2018 |
| CN | 111722893 A | 9/2020 |
| CN | 112530433 A | 3/2021 |

OTHER PUBLICATIONS

CN 202011399164.8—Office Action, mailed Jul. 6, 2023, 20 pages. (with English translation).
(Continued)

*Primary Examiner* — Vu B Hang
(74) *Attorney, Agent, or Firm* — Getech Law LLC; Jun Ye

(57) ABSTRACT

The present disclosure relates to a method and an apparatus for generating general voice commands, and the method includes: obtaining View tree content of a display interface of an application; traversing information nodes in the View tree content, and configuring different voice commands for different information nodes based on attributes of the information nodes; and aggregating all voice commands in the display interface, and mixing and filtering the commands to form a final voice command set.

8 Claims, 3 Drawing Sheets

(58) Field of Classification Search
CPC ... G10L 15/08; G10L 15/1822; G10L 15/183; G10L 15/02; G10L 15/063; G10L 15/193; G10L 15/19
See application file for complete search history.

(56) References Cited

U.S. PATENT DOCUMENTS

2016/0217114 A1* 7/2016 Fan ................... G06F 16/5854
2016/0334944 A1* 11/2016 Teodorescu ......... G06F 11/1469
2016/0357410 A1* 12/2016 Frankel ............... G06F 3/04815

OTHER PUBLICATIONS

CN 202011399164.8—Notice of Allowance, mailed Aug. 31, 2023, 6 pages. (with English translation).
PCT/CN2021/134460—International Search Report and Written opinion mailed on Mar. 1, 2022, 12 pages.

* cited by examiner

METHOD AND APPARATUS FOR GENERATING GENERAL VOICE COMMANDS AND AUGMENTED REALITY DISPLAY

CROSS REFERENCE TO RELATED APPLICATIONS

This application is a 371 of international Application No. PCT/CN2021/134460 filed Nov. 30, 2021, which claims priority to CN application Ser. No. 202011399164.8, filed Dec. 1, 2020. The contents of each of the above-captioned patent applications are hereby expressly incorporated herein by reference in their entireties.

TECHNICAL FIELD

The present disclosure relates to the field of software technologies, and in particular, to a method and an apparatus for generating general voice commands.

BACKGROUND

An augmented reality display device generally does not have a human-computer interaction interface in which a screen can be directly touched, and therefore voice interaction becomes a preferred interaction manner for the augmented reality display device. During setting of an existing voice command, an integrated command plug-in SDK needs to be used first, and then, the SDK is used to set various voice commands and function callback implementations of a current page, and at the same time, an operation prompt UI and a help UI are implemented. It is easy for a system to have and use an integrated voice plug-in SDK. However, it is cumbersome for a third-party developer and a third-party application to use the SDK through integration. In addition, it is also difficult to promote and apply voice control to third-party portrait screen applications, and the integrated voice plug-in SDK often needs to perform code invasion for the third-party application, and therefore, different controls cannot be operated based on different voice commands.

SUMMARY

The objective of the present disclosure is to provide a method and an apparatus for generating general voice commands.

The objective of the present disclosure is achieved by using the following technical solution: A method for generating general voice commands provided according to the present disclosure includes: obtaining View tree content of a display interface of an application; traversing information nodes in the View tree content, and configuring different voice commands for different information nodes based on attributes of the information nodes; and aggregating all voice commands in the display interface, and mixing and filtering the commands to form a final voice command set.

The objective of the present disclosure may alternatively be further achieved by using the following technical measures:

In the foregoing method for generating general voice commands, the View tree content of the display interface of the application is obtained by using an accessibility service function of an Android system.

In the foregoing method for generating general voice commands, the traversing information nodes in the View tree content, and configuring different voice commands for different information nodes based on attributes of the information nodes includes: recursively traversing the information nodes in the View tree content level by level and node by node, and in a traversing process, selecting each policy selector for each information node; and storing, in each policy selector, a command generated after the selection, and configuring a corresponding voice command type.

In the foregoing method for generating general voice commands, the policy selector includes a tap policy selector, a text policy selector, a list policy selector, a remote control policy selector, and a self-defined protocol policy selector.

In the foregoing method for generating general voice commands, the View tree content is sequentially traversed in a sequence of the tap policy selector, the text policy selector, the list policy selector, the remote control policy selector, and the self-defined protocol policy selector.

In the foregoing method for generating general voice commands, the aggregating all voice commands in the display interface, and mixing and filtering the commands to form a final voice command set includes: deduplicating duplicate voice commands by using a "principle of keeping the first traversed one", that is, retaining a first traversed voice command and filtering out a later traversed voice command.

In the foregoing method for generating general voice commands, the aggregating all voice commands in the display interface, and mixing and filtering the commands to form a final voice command set further includes: comparing the final voice command set with a voice command set that is set at a previous time, and if the final voice command set remains unchanged, considering current setting as invalid setting; or otherwise, sending the final voice command set to a voice assistant to complete setting of the voice command set.

The foregoing method for generating general voice commands further includes: performing a specific function according to a voice command issued by a user.

In the foregoing method for generating general voice commands, the performing a specific function according to a voice command issued by a user includes: sending a voice command prompt to the user, performing hit determining on the voice command issued by the user, and performing the specific function based on a determining result.

In the foregoing method for generating general voice commands, the sending a voice command prompt to the user includes: adding a lightweight system floating layer at a top layer of a display view of a device, and sending a command prompt based on a command type of each voice command.

The objective of the present disclosure is further achieved by using the following technical solution: An apparatus for generating a voice command provided in the present disclosure includes a processor and a memory. The memory stores a computer program, and when the computer program is executed by the processor, any method for generating a voice command in the foregoing descriptions is performed.

The objective of the present disclosure may alternatively be further achieved by using the following technical solution:

An augmented reality display device provided according to the present disclosure includes a processor and a memory. The memory stores a computer program, and when the computer program is executed by the processor, any method for generating a voice command in the foregoing descriptions is performed.

Beneficial effects of the present invention include at least the following: When a third-party application runs in a system, various voice command control functions can be attached to the third-party application without any code intrusion for the third-party application, so that it is convenient for a user to use the third-party application via voice; and in addition, a manner with no code intrusion is faster and more convenient, so that developing efficiency of system applications can be improved, an income range of an application market of a system can be expanded, a full voice control application scenario of the system can be improved, and hardware popularization is facilitated. This solution supports different types of policy selectors, and facilitates subsequent customization of various types of complex commands. In addition, different types of command prompts and command function implementations are reserved in an overall architecture, and different control operations such as tapping and sliding can be implemented based on different voice command types.

The foregoing descriptions are only summary of the technical solutions of the present disclosure. To help understand the technical means of the present disclosure more clearly for implementation according to the content of the specification, and to make the foregoing and other objectives, features, and advantages of the present disclosure more apparent and easier to understand, preferred embodiments are taken as examples below in conjunction with the accompanying drawings, and detailed descriptions are as follows.

BRIEF DESCRIPTION OF THE ACCOMPANYING DRAWINGS

DESCRIPTION OF EMBODIMENTS

To further set forth the technical means and effects used in the present disclosure to achieve the intended objectives of the invention, specific implementations, structures, characteristics, and effects of a method and an apparatus for generating general voice commands proposed in accordance with the present disclosure are described in detail as follows with reference to the accompanying drawings and preferred embodiments.

Figure 1:
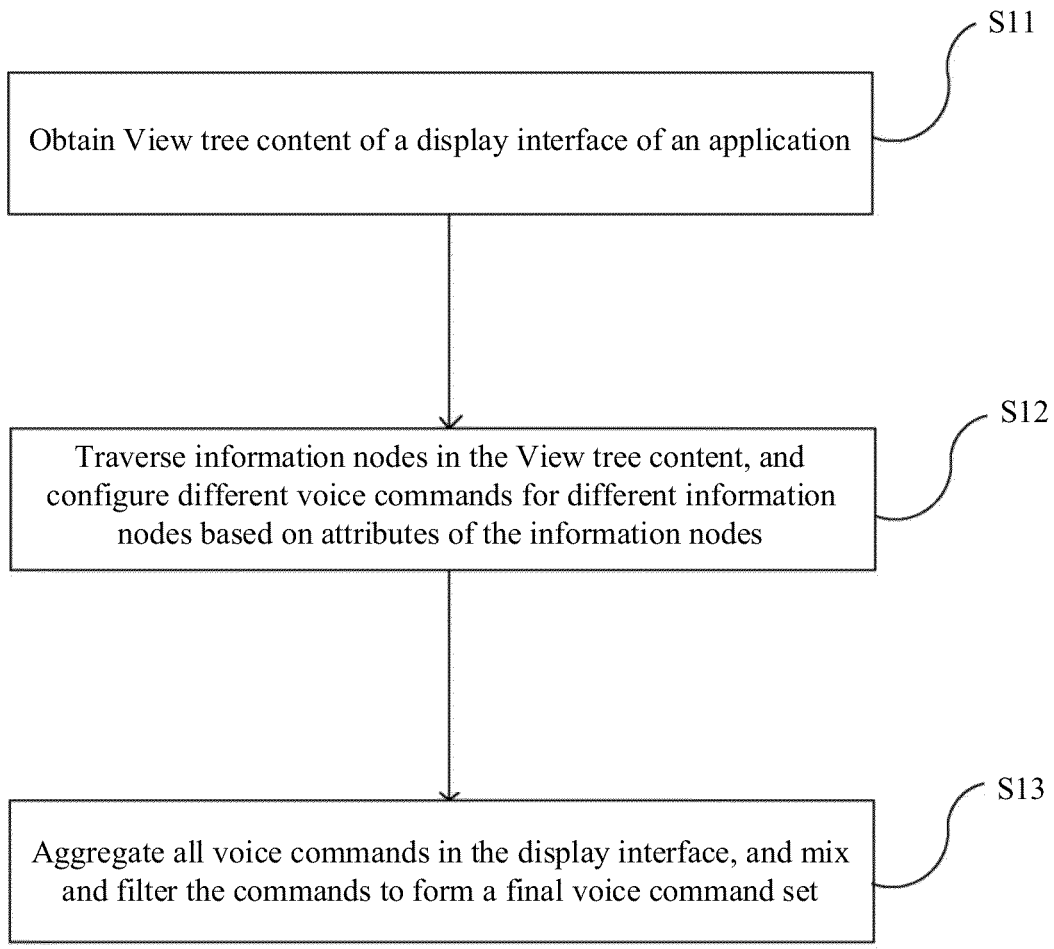
FIG. 1 is a schematic flowchart of a method for generating general voice commands according to an embodiment of the present disclosure.
Figure 2:
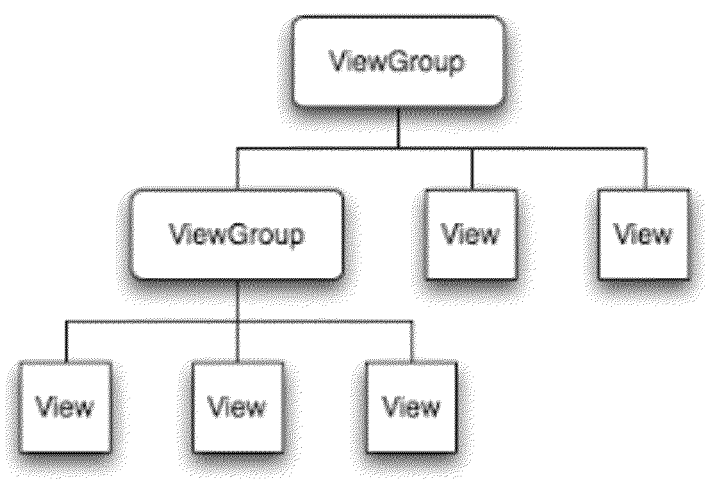
FIG. 2 is a conceptual diagram of a View node tree according to an embodiment of the present disclosure.
Figure 3:
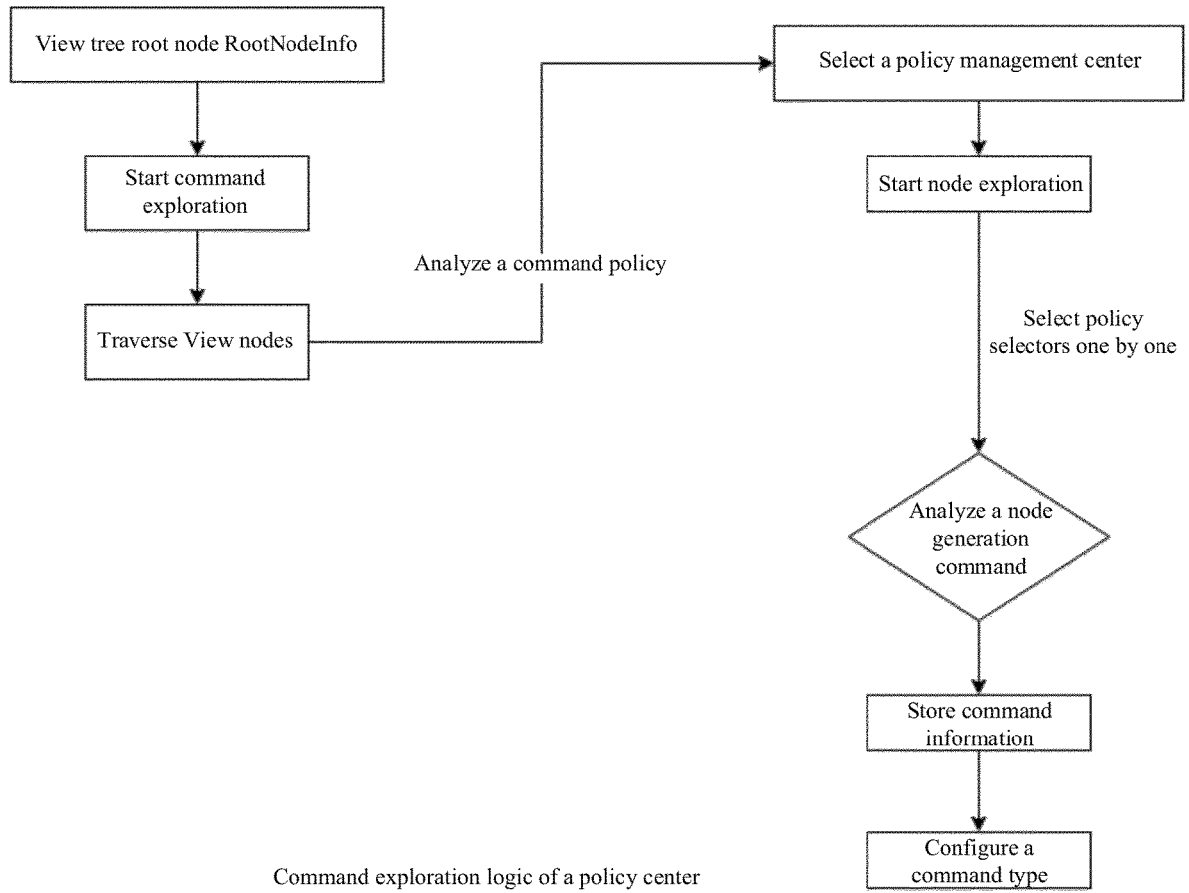
FIG. 3 is a diagram of command exploration logic of a policy selection center according to an embodiment of the present disclosure.

FIG. 1 is a schematic flowchart of a method for generating general voice commands according to an embodiment of the present disclosure. FIG. 2 is a conceptual diagram of a View node tree according to an embodiment of the present disclosure. FIG. 3 is a diagram of command exploration logic of a policy selection center according to an embodiment of the present disclosure.

As shown in FIG. 1, a method for generating general voice commands in an example of the present disclosure mainly includes the following steps.

Step S11: Obtain View tree content of a display interface of an application.

Specifically, the View tree content of the display interface of the application is obtained by using an accessibility service function of an Android system, and the accessibility service function of the Android system has an accessibility function (Accessibility). This function is officially provided by Android to help a person who is physically inconvenient or inflexible in performing operations to operate a device. In this application, View tree (that is, a control tree) content of a display interface of an application in a device is received by using an auxiliary function. View tree content of a current display interface of the device is in a form of a node tree, and the concept of a View node tree is shown in FIG. 2. It should be noted that the View tree content includes a root information node (RootNodeInfo) and information nodes (NodeInfo) in each ViewGroup. Each information node (NodeInfo) has an attribute, for example, AccessibilityNodeInfo with a tappable attribute, AccessibilityNodeInfo with a tappable attribute and non-empty text content, AccessibilityNodeInfo that inherits ListView, GridView, and RecyclerView, and AccessibilityNodeInfo with a focusable attribute. Then, processing proceeds to step S12.

Step S12: Traverse information nodes in the View tree content, and configure different voice commands for different information nodes based on attributes of the information nodes.

Specifically, a command creation center is established inside a background auxiliary service process for traversing the information nodes in the View tree content and selecting various policies of the information nodes by using policy selectors in a policy management center to generate the voice command. The policy selectors in the policy management center use a combined traversal mode and are created along with the command creation center. As shown in FIG. 3, the command creation center starts command exploration from the root information node (RootNodeInfo), recursively traverses the information nodes in the View tree content level by level and node by node, and selects policy selectors in the policy management center for the information nodes in a traversing process one by one to generate voice commands, and the voice commands generated after the selection are stored in the policy selectors and corresponding command types are configured, for example, command types such as tap, text, slide, remote control, and page turning.

In one or more embodiments, used policy selectors include a tap policy selector, a text policy selector, a list policy selector, a remote control policy selector, and a self-defined protocol policy selector. Specifically, the tap policy selector is: AccessibilityNodeInfo with a tappable attribute is selected and is aggregated into a set, and is sorted based on distances between a View center point to an upper left corner of a screen, to generate Chinese and English commands of "open a *$^{th}$ . . . ". The text policy selector is: AccessibilityNodeInfo with a tappable attribute and non-empty text content is selected to generate a voice command of text content. In an embodiment, when the text content is Chinese and the number of characters is greater than 8, the first 4 to 8 characters are selected as a command, and when the text content is English and the number of words is greater than 4, the first 2 to 4 words are selected as a command. In another embodiment, if the number of Chinese characters is less than 8 or the number of English words is less than 4, auxiliary words such as "打开", "Open", and "点击" may be added before the text content, to increase a length of the voice command, and avoid a case in which a recognition rate decreases when the voice command is excessively short. The list policy selector is: AccessibilityNodeInfo that inherits ListView, GridView, and RecyclerView is selected, and sliding commands such as "slide upward", "slide downward", "slide to the left", and "slide to the right" are generated based on a sliding policy, and meanwhile, an exploration mark is made, so that a command of "selecting N items" can be generated in combination with a subsequent sub-node traversing process. The remote control policy selector is: When AccessibilityNodeInfo has a focusable attribute, the entire AccessibilityNodeInfo can support an operation of a key node, and may enable a remote control operation command such as "move upward through remote control" to simulate an event that the key node moves upward. The self-defined protocol policy selector is: When content of a content description attribute in AccessibilityNodeInfo is not empty, detection of a self-defined protocol may be performed. For example, the content includes a prefix of a special character string, for example, [prefix:suffix] (where the suffix may include a plurality of pieces of content that are spaced apart by commas). A specific example may be [rokid: name=next page, pingyin=xia yi ye]. In this specific example, "rokid" is a name of a self-defined protocol, and is a voice command protocol integrated by a system developer into a system. When a prefix of the special character is detected, the prefix is regarded as setting of the self-defined protocol, content in the prefix is extracted, and a corresponding command is generated based on a definition in the self-defined protocol. For example, a "next page" command is generated based on "name=next page". The technical solution of the present invention can support different types of policy selectors, thereby facilitating subsequent customization of various types of complex commands. Meanwhile, different types of command prompts and command function implementations are reserved in an overall architecture, so that subsequent expansion is facilitated. In an embodiment, the View tree may be traversed in sequence by using different policy selectors, that is, the View tree may be traversed in a sequence of the tap policy selector, the text policy selector, the list policy selector, the remote control policy selector, and the self-defined protocol policy selector. Then, processing proceeds to step S13.

Step S13: Aggregate all voice commands in the display interface, and mix and filter the commands to form a final voice command set.

Specifically, duplicate voice commands are deduplicated. In an embodiment, during deduplication, a "principle of keeping the first traversed one" is used to deduplicate command names, that is, a first traversed voice command is preferentially reserved, and a later voice command is filtered out. In another embodiment, voice commands may be manually deduplicated by a user to remove a voice command corresponding to a control that is not frequently used by the user or that is not required by the user.

Specifically, step S13 further includes: comparing the final voice command set with a voice command set that is set at a previous time, and if the final voice command set remains unchanged, considering current setting as invalid setting; or otherwise, sending the final voice command set to a voice assistant to complete setting of the voice command set.

The final voice command set is sent to a voice assistant of a resident system, and the voice assistant generates a corresponding voice command characteristic based on standard pronunciation of a specific command in the voice command set, brings the voice command into effect, and listens to a voice signal sent by the user, to determine whether the voice signal sent by the user matches the voice command characteristic. It should be noted that the voice assistant is a main background system service application related to all functions of voice in an entire device system, and Chinese and English speech algorithm models are internally run to support various speech recognition operations. A sound data input of hardware, that is, a microphone, can be received, and correct speech recognition content can be output after operations. Meanwhile, various voice command settings can be received, and a voice command recognition result can be output. Inter-process communication (IPC) between a use end and the voice assistant is supported.

Optionally, the method for generating a voice command further includes: Step S14: Perform a specific function according to a voice command issued by a user.

Specifically, the performing a specific function according to a voice command issued by a user includes:
establishing a command interaction center, sending a voice command prompt to the user, performing hit determining on the voice command issued by the user, and performing the specific function based on a determining result.

Specifically, the sending a voice command prompt to the user in step S14 includes: After the final voice command set is set successfully, a UI prompt center sends a command prompt to a user who is using a third-party application. The UI prompt center adds a lightweight system floating layer at a top layer in layers of a display view of the device, and sends a command prompt based on a command type of each voice command. Example command prompt policies are provided below.

Tap command: An upper left corner of View tree content in which the tap command is located uses a white circle as background, and a black command number in the middle as a mark.

Text command: A bottom part of View tree content in which the text command is located is marked by a green transverse line.

Slide command: A sliding mark flickers once in view tree content in which the slide command.

Remote control command: There is an annulus focus point in the middle of View tree content in which the remote control command is located.

Specifically, the performing hit determining on the voice command issued by the user, and performing the specific function based on a determining result in step S14 includes:

The voice assistant performs hit determining on the voice command issued by the user; if in the currently set final voice command set, the voice assistant sends, through inter-process communication (IPC), a command hit result to the command interaction center for processing,
the command interaction center searches the final voice command set for related voice command information based on a determining result; and
if there is the related voice command information in the final voice command set, the current voice command is a valid command, and the specific function is performed based on a command type in the found voice command information; or
if there is no related voice command information in the final voice command set, processing is ignored. Examples of execution of a command function are provided below.

Tap command: AccessibilityNodeInfo corresponding to a command is controlled by using an accessibility service of a system to simulate a tap event.

Text command: AccessibilityNodeInfo corresponding to a command is controlled by using an accessibility service of a system to simulate text content.

Slide command: AccessibilityNodeInfo corresponding to a command is controlled by using an accessibility service of a system to simulate a sliding event.

Remote control command: AccessibilityNodeInfo corresponding to a command is controlled by using an accessibility service of a system to simulate a moving event.

In the foregoing descriptions, according to the method for generating a voice command in embodiments of the present disclosure, when a third-party application runs in a system, various voice command control functions can be attached to the third-party application without any code intrusion for the third-party application, so that it is convenient for the user to use the third-party application via voice. In addition, a manner with no code intrusion is faster and more convenient, so that developing efficiency of system applications can be improved, an income range of an application market of a system can be expanded, a full voice control application scenario of the system can be improved, and hardware popularization is facilitated. This solution supports different types of policy selectors, and facilitates subsequent customization of various types of complex commands. In addition, different types of command prompts and command function implementations are reserved in an overall architecture, and different control operations such as tapping, sliding, remote control, and text can be implemented based on different voice commands.

In another aspect of the present invention, one or more embodiments of the present invention further provide an apparatus for generating a voice command, including a processor and a memory. The memory stores a computer program, and when the computer program is executed by the processor, the following steps are performed:

obtaining View tree content of a display interface of an application;

traversing information nodes in the View tree content, and configuring different voice commands for different information nodes based on attributes of the information nodes; and aggregating all voice commands in the display interface, and mixing and filtering the commands to form a final voice command set.

It can be understood that the foregoing apparatus for generating a voice command may further implement one or more steps described above, and details are not described herein again.

The basic principles of the present disclosure have been described above with reference to specific embodiments, but it should be noted that the merits, advantages, effects, and the like mentioned in the present disclosure are merely examples but not limitations, and that such merits, advantages, effects, and the like cannot be considered as essential to the embodiments of the present disclosure. In addition, the foregoing specific details disclosed above are provided for purposes of examples and for purposes of ease of understanding only, and the foregoing details are not intended to limit implementation of the present disclosure to the specific details described above.

Block diagrams of components and apparatuses in the present disclosure are merely illustrative examples and are not intended to require or imply that connections, arrangements, and configurations must be made in the manners shown in the block diagrams. As will be appreciated by those skilled in the art, these components, apparatuses, devices, and systems may be connected, arranged, and configured in any manner. Words such as "include", "including", and "having" are inclusive words, and mean "including but not limited to" and may be used interchangeably with "including but not limited to". As used herein, the terms "or" and "and" refer to the term "and/or", and may be used interchangeably with "and/or", unless the context clearly dictates otherwise. As used herein, the term "such as" refers to the phrase "such as, but not limited to" and may be used interchangeably with "such as, but not limited to".

In addition, as used herein, "or" used in a list of items beginning with "at least one" indicates separate enumeration, so that a list of "at least one of A, B, or C", for example, means A or B or C, or AB or AC or BC, or ABC (that is, A, B, and C). In addition, the word "example" does not mean that the described example is preferred or better than other examples.

It should be further noted that in the system and the method in the present disclosure, the components or the steps may be divided and/or recombined. Such decomposition and/or recombination should be regarded as an equivalent solution of the present disclosure.

Various changes, substitutions, and modifications to the techniques described herein may be made without departing from the teachings defined by the appended claims. In addition, the scope of the claims of the present disclosure is not limited to specific aspects of the processing, machines, manufacture, composition of events, means, methods, and actions described above. Processing, machines, manufacture, compositions of events, means, methods, or actions that are currently present or to be developed at a later time may be used to perform substantially the same functions or achieve substantially the same results as the corresponding aspects described herein. Therefore, the appended claims include such processing, machines, manufacture, composition of events, means, methods, or actions within the range of the claims.

The foregoing descriptions of the disclosed aspects are provided to enable any person skilled in the art to make or use the present disclosure. Various modifications to these aspects will be readily apparent to those skilled in the art, and the general principles defined herein may be applied to other aspects without departing from the scope of the present disclosure. Therefore, the present disclosure is not intended to be limited to the aspects shown herein, but is to accord with the widest scope consistent with the principles and novel features disclosed herein.

What is claimed:

1. A method for generating general voice commands, wherein the method comprises:

obtaining View tree content of a display interface of an application executed on an augmented reality device;

traversing information nodes in the View tree content, and configuring different voice commands for different information nodes based on attributes of the information nodes; and aggregating all voice commands in the display interface, and mixing and filtering the commands to form a final voice command set, wherein the aggregating all voice commands in the display interface, and mixing and filtering the commands to form a final voice command set comprises: deduplicating duplicate voice commands by retaining a first traversed voice command and filtering out a later traversed voice command, wherein the aggregating all voice commands in the display interface, and mixing and filtering the commands to form a final voice command set further comprises:

comparing the final voice command set with a voice command set that is set at a previous time, and if the final voice command set remains unchanged, considering current setting as invalid setting; or otherwise, sending the final voice command set to a voice assistant executed on the augmented reality device to complete setting of the voice command set, wherein the voice assistant is further configured to receive a voice command via a microphone of the augmented reality device and recognize the voice command based on the final voice command set.

2. The method for generating general voice commands according to claim 1, wherein the View tree content of the display interface of the application is obtained by using an accessibility service function of an Android system.

3. The method for generating general voice commands according to claim 1, wherein the traversing information nodes in the View tree content, and configuring different voice commands for different information nodes based on attributes of the information nodes comprises:
   recursively traversing the information nodes in the View tree content level by level and node by node, and in a traversing process, selecting each policy selector for each information node; and
   storing, in each policy selector, a command generated after the selection, and configuring a corresponding voice command type.

4. The method for generating general voice commands according to claim 3, wherein the policy selector comprises a tap policy selector, a text policy selector, a list policy selector, a remote control policy selector, and a self-defined protocol policy selector.

5. The method for generating general voice commands according to claim 4, wherein the View tree content is sequentially traversed in a sequence of the tap policy selector, the text policy selector, the list policy selector, the remote control policy selector, and the self-defined protocol policy selector.

6. The method for generating general voice commands according to claim 1, further comprising: performing a specific function according to the voice command issued by a user.

7. The method for generating general voice commands according to claim 6, wherein the performing a specific function according to the voice command issued by a user comprises:
   sending a voice command prompt to the user, performing hit determining on the voice command issued by the user, and performing the specific function based on a determining result.

8. The method for generating general voice commands according to claim 7, wherein the sending a voice command prompt to the user comprises:
   adding a lightweight system floating layer at a top layer of a display view of a device, and sending a command prompt based on a command type of each voice command.

\* \* \* \* \*